United States Patent
Tong et al.

(10) Patent No.: US 10,782,395 B2
(45) Date of Patent: Sep. 22, 2020

(54) TRUE VELOCITY VECTOR ESTIMATION USING V2X

(71) Applicant: NXP B.V., Eindhoven (NL)

(72) Inventors: Ziqiang Tong, Bayern (DE); Liang Li, Eindhoven (NL)

(73) Assignee: NXP B.V., Eindhoven (NL)

( * ) Notice: Subject to any disclaimer, the term of this patent is extended or adjusted under 35 U.S.C. 154(b) by 219 days.

(21) Appl. No.: 15/848,310

(22) Filed: Dec. 20, 2017

(65) Prior Publication Data
US 2019/0187269 A1    Jun. 20, 2019

(51) Int. Cl.
| G01S 13/58 | (2006.01) |
| G01S 13/86 | (2006.01) |
| G01S 13/931 | (2020.01) |
| G01S 7/00 | (2006.01) |

(52) U.S. Cl.
CPC ............ *G01S 13/589* (2013.01); *G01S 7/003* (2013.01); *G01S 13/86* (2013.01); *G01S 13/865* (2013.01); *G01S 13/931* (2013.01); *G01S 2013/932* (2020.01); *G01S 2013/9316* (2020.01); *G01S 2013/9322* (2020.01); *G01S 2013/9323* (2020.01); *G01S 2013/9329* (2020.01); *G01S 2013/93271* (2020.01)

(58) Field of Classification Search
CPC .......... G01S 7/003; G01S 13/08; G01S 13/42; G01S 13/589; G01S 13/931; G01S 13/86; G01S 13/865; G01S 2013/936; G01S 2013/9367
See application file for complete search history.

(56) References Cited

U.S. PATENT DOCUMENTS

| 2014/0274124 A1* | 9/2014 | Cheng ................. G01S 5/0072 455/456.1 |
| 2017/0236421 A1 | 8/2017 | Yang et al. |
| 2017/0307733 A1 | 10/2017 | Stainvas Olshansky et al. |
| 2019/0179002 A1* | 6/2019 | Takayama ............. G01S 13/588 |

FOREIGN PATENT DOCUMENTS

| DE | 102013018310 A1 | 4/2015 |
| EP | 2068173 A1 | 6/2009 |

OTHER PUBLICATIONS

Kellner et al. "Instantaneous Lateral Velocity Estimation of a Vehicle using Doppler Radar," 16th International Conference on Information Fusion (Fusion), Istanbul, Turkey, Jul. 9-12, 2013, 8 pages.
Kellner et al. "Instantaneous full-motion estimation of arbitrary objects using dual Doppler radar," IEEE Intelligent Vehicles Symposium Proceedings, Dearborn, MI, USA , Jun. 8-11, 2014, p. 324-329.

* cited by examiner

*Primary Examiner* — Peter M Bythrow
*Assistant Examiner* — Michael W Justice (57) ABSTRACT

Embodiments are provided herein for a radar system and a method for determining true velocity, which includes: obtaining a radial velocity component that corresponds to a target object, based on sensor data detected by a radar sensor on a vehicle; obtaining a true velocity magnitude of the target object from a communication protocol; and calculating a true velocity angle of direction of the target object based on a trigonometric relationship established between the radial velocity component and the true velocity vector.

20 Claims, 5 Drawing Sheets

TRUE VELOCITY VECTOR ESTIMATION USING V2X

BACKGROUND

Field

This disclosure relates generally to radar systems, and more specifically, to determining a true velocity vector of a target object detected in a radar system.

Related Art

Vehicles are often equipped with electronic control systems to assist drivers in controlling the vehicle. Such systems may include radio frequency (RF) radar systems that detect objects in the surrounding environment of the vehicle. It is important that RF radar systems are able to detect the velocity of objects quickly, especially for collision avoidance. However, many RF radar systems presently use temporal regression analysis techniques for estimating the velocity of an object detected by a single radar sensor, which combines measurements over several radar frames to interpolate the velocity. This detection time may be long when compared with real time changes in object velocity, and may result in inaccurate object velocity being detected by the radar system, which can be especially disastrous in an automotive environment.

BRIEF DESCRIPTION OF THE DRAWINGS

The present invention may be better understood, and its numerous objects, features, and advantages made apparent to those skilled in the art by referencing the accompanying drawings.

The present invention is illustrated by way of example and is not limited by the accompanying figures, in which like references indicate similar elements, unless otherwise noted. Elements in the figures are illustrated for simplicity and clarity and have not necessarily been drawn to scale.

DETAILED DESCRIPTION

The following sets forth a detailed description of various embodiments intended to be illustrative of the invention and should not be taken to be limiting.

Overview

In advanced driver assistance systems (ADAS), a velocity estimation of moving objects in the vicinity of a vehicle is an essential system requirement. However, the true velocity vector of an object cannot be measured directly by a radar sensor of a radio frequency (RF) radar system. Instead, the radar sensor determines a radial component of the object's true velocity vector, also referred to as a radial velocity component, in a radial direction toward or away from the radar sensor. The classic method for estimating the true velocity vector of an object is a temporal filter, such as a Kalman filter that implements temporal regression analysis. The Kalman filter takes several of the radar sensor's instantaneous measurements of the radial velocity component over a period of several radar frames to estimate the object's true velocity vector, since the changes in the object's position and direction can be seen over time. The Kalman filter also requires several radar frames to settle, which results in a start latency of a couple hundred milliseconds. As ADAS becomes more advanced, there is a desire to determine accurate velocity within a single radar frame, such as within 40 to 50 milliseconds.

The present disclosure provides a real-time true velocity vector estimation solution in an RF radar system, which calculates an angle of direction for a true velocity vector of an object within a single radar frame using a single radar sensor and information obtained through a vehicle communication protocol, also referred to as a vehicle-to-everything (V2X) communication protocol. The radar sensor is used to obtain a respective instantaneous measurement of a target object's radial velocity component, where the measurement includes a magnitude of the radial velocity component and angle information about the location of the target object relative to the radar sensor. A magnitude of the true velocity vector of the target object is also received through the V2X communication protocol. The magnitude may be received directly from the target object itself (such as when the target object is a vehicle also equipped to implement the V2X communication protocol). A true velocity direction calculator uses a trigonometric relationship established between the radial velocity component and the unknown true velocity vector (e.g., based on right triangle relationships between radial velocity component and the unknown true velocity vector) to determine an angle of the true velocity vector relative to the radial velocity component. The proposed solution may estimate the target object's true velocity angle of direction using an instantaneous measurement obtained by the radar sensor at a same time (e.g., a triggering moment) that the magnitude of the true velocity vector is received, and performs the true velocity direction calculations within the time of one radar frame (e.g., typically less than 50 milliseconds), which is much shorter than conventional temporal regression analysis techniques (e.g., greater than hundreds of milliseconds) and provides a more accurate estimation of the true velocity of the object.

Example Embodiments

Figure 1:
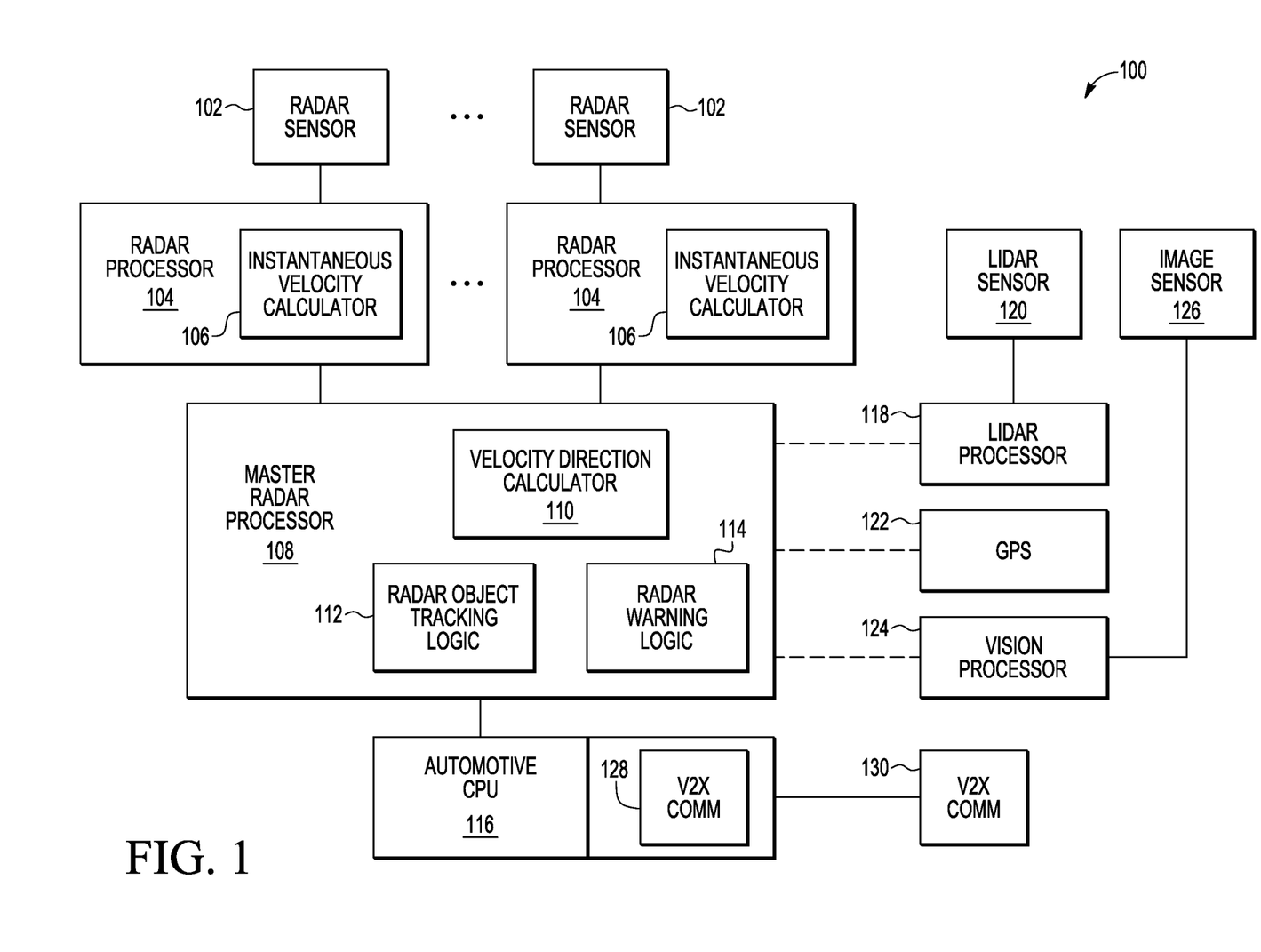
FIG. 1 is a block diagram depicting an example radio frequency (RF) radar system implementing a true velocity direction calculator according to some embodiments of the present disclosure.

FIG. 1 is a block diagram depicting an example radio frequency (RF) radar system 100 that implements a true velocity direction calculator 110, as further discussed below. RF radar system 100 may be implemented in a vehicle and may be configured to use RF signals to determine information about the environment surrounding the vehicle. In the embodiments discussed herein, RF radar system 100 may implement a frequency modulated continuous wave (FMCW) radar scheme, such as using a chirp signal having a periodic function (e.g., sinusoidal, sawtooth) with ramping (e.g., increasing or decreasing) frequency that can be used to measure both velocity and distance, or may implement other radar schemes that can be used to measure velocity, or both velocity and distance, in other embodiments. RF radar system 100 includes at least one radar sensor 102, a local radar processor 104 communicatively coupled to a respective radar sensor 102, and a master radar processor 108 communicatively coupled to all local radar processors 104. In some embodiments, the functionality of the master radar processor 108 may be implemented on one of the local radar processors 104. In some embodiments, a single processor is used to implement the master radar processor 108A and one or more (or all) of the local radar processors 104, which may be implemented using a computing device like that shown in FIG. 6. These components of FIG. 1 are further discussed below.

Each radar sensor 102 is configured to detect objects in a surrounding environment. Each radar sensor 102 includes an RF front-end block, which implements front end components of a transceiver (which may include both a transmitter circuit and a receiver circuit) for transmitting and receiving RF signals via at least one antenna. In some embodiments, a single antenna with a coupling device may be used to switch between a transmitter and a receiver of the RF front-end block, while other embodiments may use a dedicated transmitting antenna and a dedicated receiving antenna. The front-end components may include but are not limited to a transmitter power amplifier, a receiver low noise amplifier, one or more baluns, one or more filters, a circulator or other coupling device to the antenna, impedance matching elements, a local oscillator, a phase locked loop, a resonance and bandwidth circuit (e.g., one or more resistors and capacitors), control logic, and other appropriate front-end elements.

During functional operation of the radar system 100, each radar sensor 102 drives an output signal (e.g., a chirp signal, or other RF signal depending on the radar scheme implemented) on a transmitting (Tx) antenna, which backscatters off an object in the range of radar system 100, and an echo signal is received on a receiving (Rx) antenna of the radar sensor 102. The Tx and Rx antennas of the radar sensor 102 each have a radiation pattern (which may be identical if the Tx and Rx antennas are implemented by a single antenna) including a main lobe centered on a beam axis of the respective antenna and a number of surrounding side lobes at various angles. This radiation pattern establishes a detection field for the radar sensor 102 to receive echo signals from the surrounding environment. Each radar sensor 102 may be located at various positions on a vehicle and aimed away from the vehicle to receive echo signals from different portions of the surrounding environment. A radar sensor 102 may be located adjacent to another radar sensor 102 and may have detection fields that partially overlap, where such adjacent radar sensors 102 may be also referred to as neighboring radar sensors 102. Each radar sensor 102 may be permanently stationary or may be adjustable to re-direct the detection fields.

The RF front-end block of the radar sensor 102 may also implement a functional evaluation circuit. Since the echo signal is delayed in time as compared with the transmitter output signal, the functional evaluation circuit outputs a signal (also referred to as sensor data) indicating the relationship between the echo signal and the transmitter output signal. This sensor data may be provided by the radar sensor 102 in an on-going or continuous manner. The RF front-end block may also implement an analog-to-digital converter (ADC) to digitize this sensor data signal at a known sample rate. The radar sensor 102 provides this sensor data to its local radar processor 104, which is configured to perform object processing on the sensor data. Object processing may include object detection, object classification, and object tracking. For example, once an object is detected, radar processor 104 is configured to classify or distinguish stationary objects from moving objects. Radar processor 104 performs object tracking on moving objects (e.g., associating each detected moving object with an identification tag), while stationary objects are disregarded.

As part of object processing, each radar processor 104 implements a radial velocity calculator 106, which is configured to calculate an instantaneous measurement of a radial velocity component for each sensor data sample. The radial velocity component is a component of the moving object's true velocity vector that is measured in a radial direction toward or away from the radar sensor, where the radial velocity component includes a velocity magnitude and an angle measured from the radar sensor to the moving object, as further discussed in connection with FIG. 2. Depending on the radar signal scheme implemented by the radar sensors (e.g., whether the output signal transmitted by the radar sensors 102 can be used to determine distance), the radar processor 104 may also be configured to determine a distance between the radar sensor 102 and the moving object.

Since the local radar processor 104 is configured to receive sensor data from a single radar sensor 102, the processor 104 is configured to perform object detection independently of the other radar processors 104. Each of the local radar processors 104 are configured to provide information about the detected moving objects to the master radar processor 108 at some known radar frame rate (e.g., 40 to 50 ms) for object tracking, such as providing the instantaneous measurement of the radial velocity component for each moving object, an estimated distance between the vehicle and the moving object, and any identification tags associated with each moving object.

Master radar processor 108 implements radar object tracking logic 112, which is configured to perform object tracking based on the received object information. Master radar processor 108 implements true velocity direction calculator 110 (also referred to herein as calculator 110), which uses an instantaneous measurement of the radial velocity component together with true velocity magnitude (from V2X comm 128, discussed below) to estimate the true velocity vector of the object, as further discussed below. In some embodiments, calculator 110 is implemented, at least in part, as circuitry in the master radar processor 108. In some embodiments, calculator 110 is configured to calculate the true velocity vector within a single frame (e.g., before the next instantaneous measurement is received). The true velocity vector may also be provided to radar object tracking logic 112.

Master radar processor 108 may also implement radar warning logic 114, which is communicatively coupled with radar object tracking logic 112. Based on the moving objects being tracked in the vicinity of the vehicle by radar object tracking logic 112, radar warning logic 114 may determine that a warning should be provided to the driver to alert the driver of dangerous driving conditions. In some embodiments, radar warning logic 114 may also be communicatively coupled to an automotive CPU (central processing unit) 116, which may be implemented using one or more processing units. Radar warning logic 114 may also provide a warning to automotive CPU 116, which controls other ADAS systems to provide immediate driver assistance. For example, radar warning logic 114 may issue a warning to the driver that a collision is imminent so the driver can take appropriate action to avoid the collision, or may issue a warning to a collision avoidance system that assists in braking or steering to avoid the collision, or both. The warning provided to the automotive CPU 116 may also include information associated with the moving object.

Automotive CPU 116 may also implement a vehicle-to-everything (V2X) communication protocol module (or V2X comm) 128 that is configured to establish communication chains with other V2X communication protocol modules (or V2X comm) 130. For example, V2X communication protocol 130 may be implemented on other vehicles. In the embodiments discussed herein, V2X comm 128 is configured to establish a communication chain with V2X comm 130 on the target object itself. The target object self-reports its velocity (e.g., a speed reading on a speedometer of the target object) on the communication chain, which is provided to velocity direction calculator 110 as the magnitude of the true velocity vector of the target object. Calculator 110 can then estimate the angle of direction of the target object's true velocity vector using a trigonometric relationship established between the radial velocity component calculated by a radar sensor and the true velocity vector, as discussed below. Since latency of the communication chain may be long as compared to the frame rate of the radar system 100, a minimal amount of data (e.g., the speed reading) is provided via the communication chain.

Other systems implemented in the vehicle may also determine velocity measurements, angle of direction measurements, or both, and may optionally provide these measurements (as indicated by the dashed lines) to the calculator 110 via the master radar processor 108 (or via the automotive CPU 116, depending on how the systems are communicatively coupled). Additionally, V2X comm 130 may also be implemented on structures such as roadside stations that may be configured to estimate velocity of passing vehicles or other objects, which may be optionally provided to calculator 110. Calculator 110 may optionally use these measurements to perform a "sanity check" on the calculated true velocity vector. For example, calculator 110 may receive measurements from a LIDAR (light detection and ranging) system that includes at least one LIDAR processor 118 and at least one LIDAR sensor 120 (e.g., a velocity measurement of the target object), from a global positioning system (GPS) 122 (e.g., positioning information of the vehicle or the target object or the surrounding environment), or from a vision system that includes at least one vision processor 124 and at least one image sensor 126 (e.g., a velocity or angle measurement of the target object). The rate at which these measurements are provided to calculator 110 may be much slower than the radar frame rate implemented by the radar system 100, so the sanity check may be performed periodically on receipt of one or more of these measurements after tens or hundreds of true velocity vector calculations have been performed. The sanity check confirms whether a received measurement agrees with a calculated true velocity vector. For example, calculator 110 checks whether a received velocity measurement corresponding to the target object is within an acceptable tolerance of the calculated true velocity magnitude, or whether a received angle of direction of the target object is within an acceptable tolerance of the calculated angle of direction.

It is noted that the true velocity vector estimation solution provided herein is suitable for small object detection, such as for pedestrians, bicycles, small motorized vehicles, and the like, that may have a single detection point detected by the radar sensors 102, as compared with large objects that provide a cluster of detection points detected by the radar sensors. The solution provided herein may be applied to large objects, but may require additional clustering of the detection points to group detection points corresponding to a single large moving object (e.g., rather than several small moving objects).

Figure 2:
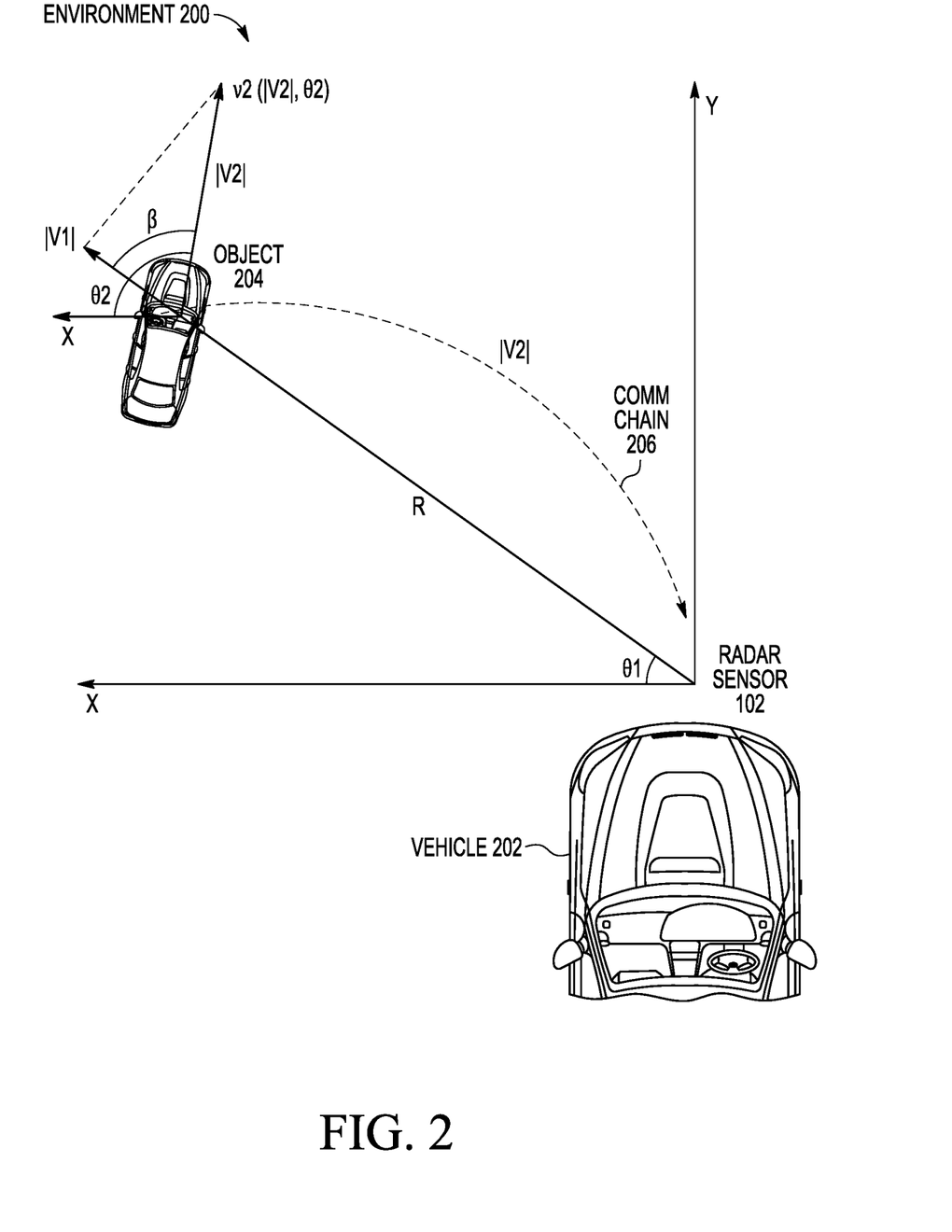
FIG. 2 is a block diagram depicting example radar detection of a target object according to some embodiments of the present disclosure.

FIG. 2 shows example radar detection of a target object 204 by a single radar sensor 102. Radar sensor 102 is positioned externally on a vehicle 202, which is near the front of the vehicle on the passenger side in the embodiment shown. Also in the embodiment shown, vehicle 202 is traveling in a direction toward the top of the page in an environment 200, where the direction of travel of the vehicle is illustrated as the y-axis. The object 204 is also traveling on a trajectory through the environment 200 in the vicinity of the vehicle 202. FIG. 2 shows the object 204 at an example point along the trajectory at a point in time T.

As used herein, a vector has both a magnitude and an angle of direction. The magnitude can be represented visually by a line or an arrow having a length that corresponds to the magnitude, and is drawn in a direction in which the vector is moving, where the angle of direction can be represented by an angle measured from a reference line or vector to the arrow. In the embodiment provided herein, a reference line or reference axis is defined as being perpendicular to the direction of travel of the vehicle 202 (e.g., the x-direction is perpendicular to the vehicle's direction of travel), although another reference line or reference axis may be defined in the alternate (e.g., the y-direction, which is parallel to the vehicle's direction of travel), where a trigonometric relationship may be similarly established from any defined reference line or reference axis, as discussed below.

The object 204 has a true velocity vector V2, which is also notated as a dotted v2 function of a magnitude |V2| and a (presently unknown) theta angle of direction, or $\vec{v}2(|V2|,\theta2)$. Radar sensor 102 (in combination with a local radar processor 104) is configured to make an instantaneous measurement of the radial velocity component V1, which is measured in a radial direction toward or away from the radar sensor 102. As shown in FIG. 2, the radial direction is aligned with a radius R measured from the radar sensor 102 to the object 204 (also referred to as a radial axis R). The true velocity vector V2 is tangential to the trajectory at the point in time T. A reference vector x is also shown, which is parallel to the reference axis (e.g., the x-axis).

Radial velocity component V1 can be seen as a vector projection (e.g., an orthogonal projection) of true velocity vector V2 onto the radial axis R. Radial velocity component V1 includes a magnitude |V1| and a theta angle of direction $\theta1$, which are determined by the radar sensor 102 (in combination with the local radar processor 104). The theta angle $\theta1$ is measured between the reference axis (e.g., the x-axis) to the radial axis R of the object 204. This theta angle $\theta1$ is the same angle formed between a reference vector x (e.g., parallel to the x-axis) and the radial velocity component V1 (e.g., parallel to the radial axis R). Another angle is also formed between the radial velocity component V1 and the true velocity vector V2, which is also referred to as a beta angle $\beta$.

Figure 3:
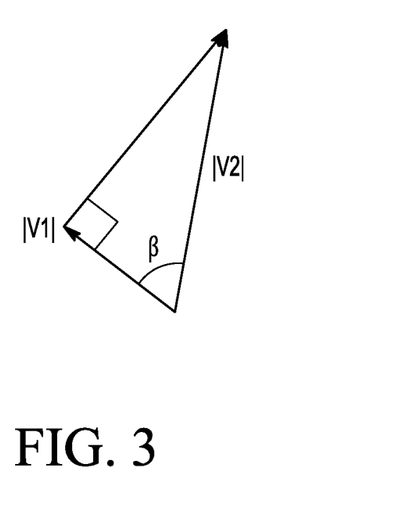
FIGS. 3 and 4 are block diagrams depicting an example trigonometric relationship established between a detected radial velocity component and a true velocity vector of the target object according to some embodiments of the present disclosure.

FIG. 3 shows true velocity vector V2 and radial velocity component V1 measured by radar sensor 102. Since radial velocity component V1 is an orthogonal vector projection of true velocity vector V2, a right triangle relationship or trigonometric relationship can be established between V1 and V2, with V2 as the hypotenuse and V1 as an adjacent side of the right triangle. A vertex angle is formed by V1 and V2 at the object 204, which is labeled as beta angle β.

Since a right triangle relationship is established between V1 and V2, vertex or beta angle β can be expressed as a trigonometric function of V1 and V2. For example, a cosine function of the vertex angle, or cos(β), is equal to the adjacent side (or V1) divided by the hypotenuse (or V2). The vertex angle can then be expressed as the inverse cosine function of V1 divided by V2:

$$\beta = \arccos\left(\frac{V1}{V2}\right)$$ Expression 1

Figure 4:
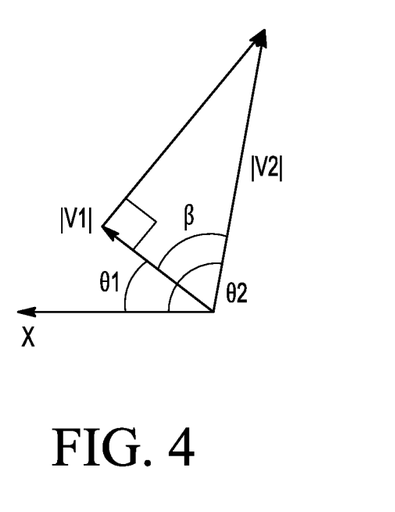

FIG. 4 shows true velocity vector V2 and radial velocity component V1, with the addition of reference vector x. As noted above, the theta angle θ1 measured between the reference axis (e.g., x-axis) and the radial axis R is equivalent to the angle formed between the reference vector x and radial velocity component V1, which is also labeled as theta angle θ1. The unknown theta angle θ2 of the true velocity vector can be determined based on theta angle θ1 and calculated beta angle β (e.g., from expression 1). In the example shown, theta angle θ2 is equal to theta angle θ1 plus beta angle β:

θ2=θ1+β  Expression 2

In some embodiments, these trigonometric expressions may be predefined or preprogrammed in calculator 110, which is configured to calculate the beta angle according to trigonometric expression 1, using the instantaneous measurement of radial velocity magnitude V1 and the received true velocity magnitude V2. Once the beta angle is determined, the theta angle θ2 can be calculated using trigonometric expression 2. In this manner, calculator 110 is configured to determine the theta angle of a true velocity vector V2 for the object 204, which can be used to accurately track the object 204.

Figure 5:
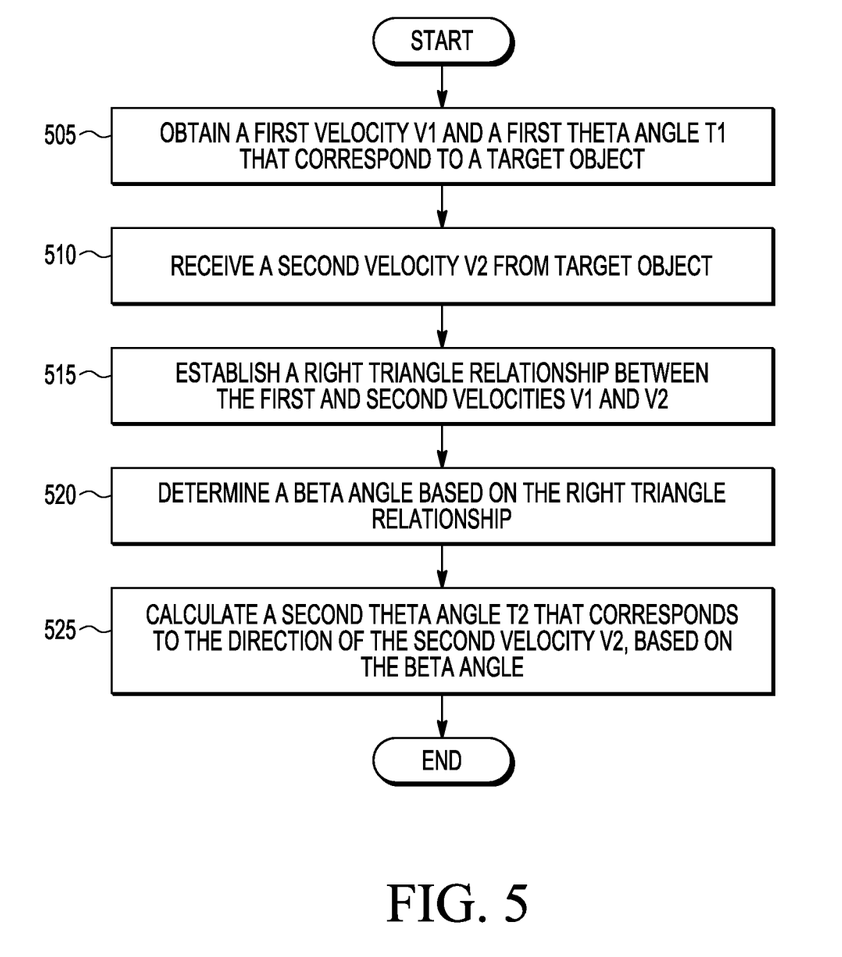
FIG. 5 is a flowchart diagram depicting an example process for determining a true velocity vector of a target object, according to some embodiments of the present disclosure.

FIG. 5 is a flowchart diagram depicting an example process for determining a theta angle for a true velocity vector of a target object, which may be implemented by true velocity direction calculator 110. The process begins at operation 505, where calculator 110 obtains a radial velocity component that includes a first velocity magnitude V1 and a first theta angle T1 (or θ1) that correspond to a target object. As discussed above, the first radial velocity component is calculated by a local radar processor 104 based on sensor data obtained by a radar sensor 102 from a detection field. The radial velocity component is provided to calculator 110, which may be implemented by master radar processor 108. The process continues to operation 510, where calculator 110 obtains a second velocity magnitude V2 that corresponds to the target object. As discussed above, the second velocity magnitude is received from the target object through a V2X communication chain. Although operations 505 and 510 are shown in consecutive order, operations 505 and 510 are performed concurrently (e.g., the first and second velocity magnitudes are obtained during a same radar frame).

The process continues to operation 515, where calculator 110 establishes a right triangle relationship between the radial velocity component V1 and the true velocity vector V2, as discussed above in connection with FIG. 3. Although operation 515 is shown as being performed each time an angle of direction of a true velocity vector needs to be determined, the trigonometric relationship of operation 515 may instead be predefined for the calculator 110 (e.g., at a factory install or some time before runtime operation of the calculator 110), where operation 515 is omitted from the process performed by calculator 110 at runtime.

The process continues to operation 520, where calculator 110 determines a beta angle β that corresponds to the vertex angle between V1 and V2, based on the trigonometric relationship, as discussed above in connection with FIG. 3. The process then continues to operation 525, where calculator 110 calculates a second theta angle T2 (or θ2) of the true velocity vector V2 based on the beta angle calculated in operation 520, as discussed above in connection with FIG. 4. The process then ends.

Figure 6:
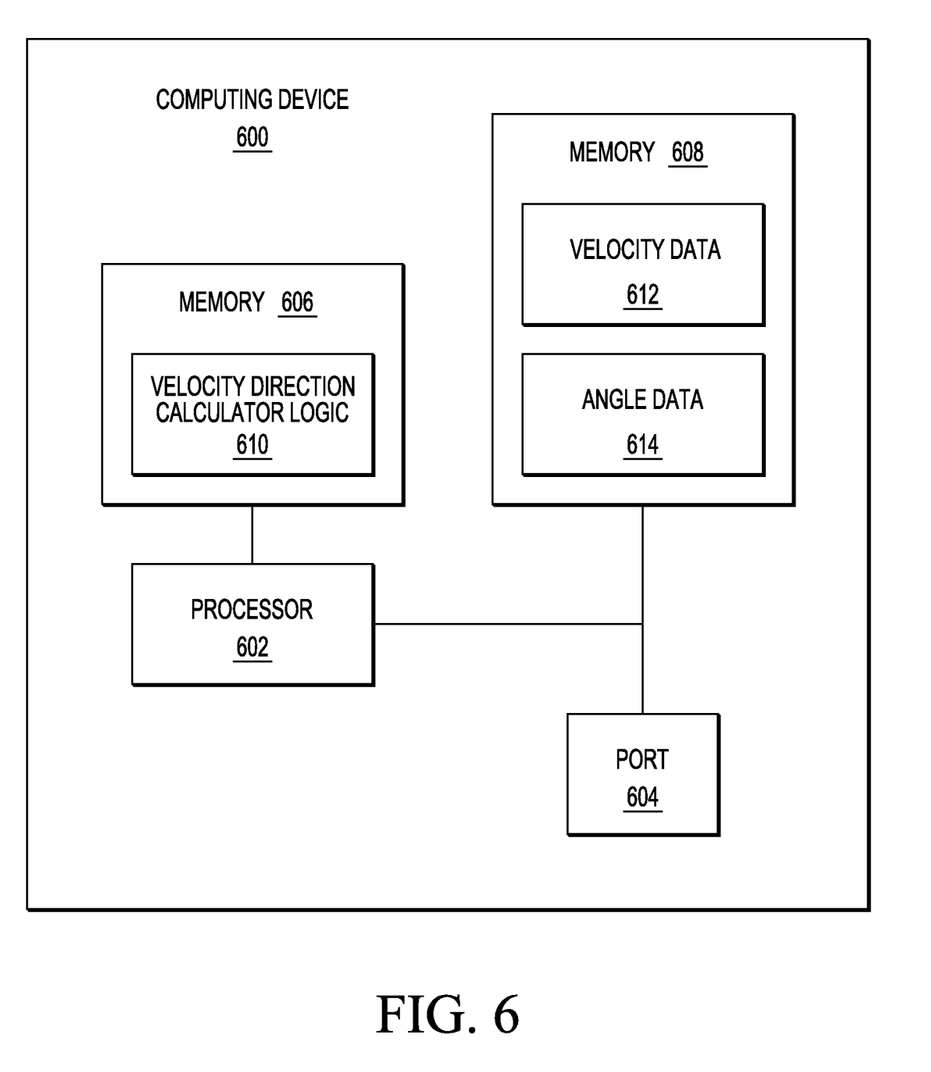
FIG. 6 is a block diagram illustrating relevant components of an example computing device in which a true velocity direction calculator can be implemented, according to one embodiment of the present disclosure.

FIG. 6 shows relevant components of an example computing device 600 that may be used to implement functionality of a master radar processor 108, which includes velocity direction calculator 110. In some embodiments, computing device 600 is used to implement the functionality of the master radar processor 108, as well as the functionality of one or more local radar processors 104 including the instantaneous velocity calculator 106. Computing device 600 includes at least one processing unit or processor 602, associated memory 606 and 608, and one or more input/output (I/O) ports 604, which are coupled to one another to send and receive data and control signals via one or more buses or other interconnects. Computing device 600 is communicatively coupled to other computing devices (e.g., one or more local radar processors 104, a radar sensor 102, or both) by the one or more ports 604, which may be hardware ports or other network interfaces that can be linked to the other computing devices, such as by a wired or wireless connection via the I/O port 604. Computing device 600 receives data from the other computing devices, such as velocity data 612 and angle data 614, which is stored in associated memory 608. Velocity data 612 may include instantaneous velocity magnitude measurements received from a radar processor based on sensor data from a radar sensor, and may also include velocity magnitude measurements received from a target object through a V2X communication chain or channel, and may also include velocity magnitude measurements received from any one of a LIDAR system, a GPS system, a vision system, or another V2X communication chain or channel. Angle data 614 may include instantaneous velocity angle measurements received from a radar processor based on sensor data from a radar sensor, and may include velocity angle measurements received from any one of a LIDAR system, a GPS system, a vision system, or another V2X communication chain or channel. In some embodiments, memory 608 may also store radar data received from a radar sensor and memory 606 may implement instantaneous velocity calculator logic to calculate an instantaneous velocity component that is provided directly to velocity direction calculator logic 610 (e.g., in embodiments where computing device 600 implements both local radar and master radar processor functionality).

The processor 602 is configured to process data 612 and 614 according to logic 610 stored in memory 606 that implements the functionality of the velocity vector calculator 110. Memory 606 may similarly store logic that implements the functionality of radar object tracking logic 112 and radar warning logic 114, shown in FIG. 1. Processor 602 may produce output information based on data 612 and 614, such as velocity vector data, which may be provided to radar object tracking logic 112 that uses the velocity vector data for object detection, classification, and tracking. Radar object tracking logic 112 may also provide information to radar warning logic 114, such as for collision avoidance.

Radar warning logic 114 may also provide information to an automotive CPU 116, as discussed above.

In some embodiments, logic 610 is a list of instructions such as a particular application program, an operating system, or both, which is typically stored internally on computer readable storage medium of the computing device. Examples of a computing device 600 include but are not limited to a mainframe, a server, a workstation, a personal computer, a minicomputer, and the like. Examples of a processor 602 include but are not limited to microprocessors, PLDs (Programmable Logic Devices), or ASICs (Application Specific Integrated Circuits)) configured to execute instructions stored in the local memory. Examples of memory 606 or memory 608 include but are not limited to various types of computer readable media such as volatile storage media including registers, buffers or caches, main memory, RAM (Random Access Memory), ROM (Read Only Memory); nonvolatile memory storage media including semiconductor-based memory units such as FLASH memory, EEPROM, EPROM, ROM; magnetic storage media including disk and tape storage media; optical storage media such as compact disk media (e.g., CD ROM, CD R, etc.) and digital versatile disk (DVD) storage media; ferromagnetic digital memories; MRAM; and data transmission media including computer networks, point-to-point telecommunication equipment, and carrier wave transmission media, just to name a few. Computer readable storage media may be permanently, removably or remotely coupled to the computing device 600.

The circuitry described herein may be implemented on a semiconductor substrate, which can be any semiconductor material or combinations of materials, such as gallium arsenide, silicon germanium, silicon-on-insulator (SOI), silicon, monocrystalline silicon, the like, and combinations of the above.

As used herein, a "node" means any internal or external reference point, connection point, junction, signal line, conductive element, or the like, at which a given signal, logic level, voltage, data pattern, current, or quantity is present. Furthermore, two or more nodes may be realized by one physical element (and two or more signals can be multiplexed, modulated, or otherwise distinguished even though received or output at a common mode).

The following description refers to nodes or features being "connected" or "coupled" together. As used herein, unless expressly stated otherwise, "coupled" means that one node or feature is directly or indirectly joined to (or is in direct or indirect communication with) another node or feature, and not necessarily physically. As used herein, unless expressly stated otherwise, "connected" means that one node or feature is directly joined to (or is in direct communication with) another node of feature. For example, a switch may be "coupled to a plurality of nodes, but all of those nodes need not always be "connected" to each other; the switch may connect different nodes to each other depending upon the state of the switch. Furthermore, although the various schematics shown herein depict certain example arrangements of elements, additional intervening elements, devices, features, or components may be present in an actual embodiment (assuming that the functionality of the given circuit is not adversely affected).

By now it should be appreciated that there has been provided a real-time true velocity vector estimation solution in an RF radar system, which calculates an angle of direction for a true velocity vector of an object within a single radar frame using a single radar sensor and information obtained through a vehicle communication protocol. The present disclosure improves upon the technological field of radar detection by providing a novel approach for calculating true velocity in a more accurate manner and in less time (e.g., within a single radar frame) than it takes conventional temporal regression analysis techniques (e.g., multiple radar frames). The present disclosure also provides technological improvement of the capabilities of the existing radar sensor hardware and radar processors implemented in a radar system, where the novel approach for calculating true velocity enables existing radar sensor hardware and radar processors to achieve faster object velocity detection than previously available.

In one embodiment of the present disclosure, a method for determining a true velocity vector in a radar system is provided, which includes: obtaining a radial velocity component that corresponds to a target object, based on sensor data detected by a radar sensor on a vehicle; obtaining a true velocity magnitude of the target object from a communication protocol; and calculating a true velocity angle of direction of the target object based on a trigonometric relationship established between the radial velocity component and the true velocity vector.

One aspect of the above embodiment provides that the true velocity magnitude is received from the target object through a communication chain established by the communication protocol.

Another aspect of the above embodiment provides that the radial velocity component is a vector projection of the true velocity vector on a radial axis, the radial axis being a straight line extending from the radar sensor through the target object.

A further aspect of the above embodiment provides that the radial velocity component includes a radial velocity magnitude and a theta angle, wherein the theta angle is formed between a reference axis perpendicular to a direction of travel of the vehicle and the radial axis.

Another further aspect of the above embodiment provides that the method further includes: establishing a right triangle relationship between the true velocity vector as a hypotenuse and the radial velocity component as an adjacent side, which form a vertex angle at the target object.

Another further aspect of the above embodiment provides that the method further includes: defining the true velocity magnitude as a trigonometric expression equal to the radial velocity magnitude divided by a cosine function of the vertex angle.

Another further aspect of the above embodiment provides that the method further includes: calculating the vertex angle based on the trigonometric expression.

Another further aspect of the above embodiment provides that the method further includes: calculating the true velocity angle of direction by adding the beta angle to the theta angle, wherein the true velocity angle is formed between the reference axis and the true velocity vector.

Another aspect of the above embodiment provides that the true velocity vector is calculated in a single radar frame.

Another aspect of the above embodiment provides that the method further includes: receiving one or more of an additional velocity magnitude and additional angle of direction that corresponds to the target object; and performing a sanity check of the true velocity vector using one or more of the additional velocity magnitude and the additional angle of direction, wherein one or more of the additional velocity magnitude and the additional angle of direction are received from one or more of a group including: a communication chain established by the communication protocol from a roadside station or other vehicle, a LIDAR (light detection and ranging) system, a GPS (global positioning system) processor, and a vision processor.

In another embodiment of the present disclosure, a radar system is provided, which includes: a radar sensor on a vehicle; a radar processor coupled to the radar sensor, the radar processor configured to determine a radial velocity component that corresponds to a target object, based on sensor data detected by the radar sensor; a communication protocol module configured to receive a true velocity magnitude of the target object; a true velocity direction calculator configured to: receive the radial velocity component and the true velocity magnitude, and calculate a true velocity angle of direction of the target object based on a trigonometric relationship established between the radial velocity component and a true velocity vector of the target object.

One aspect of the above embodiment provides that the true velocity magnitude is received from the target object through a communication chain established by the communication protocol module.

Another aspect of the above embodiment provides that the radial velocity component is a vector projection of the true velocity vector on a radial axis, the radial axis being a straight line extending from the radar sensor through the target object.

A further aspect of the above embodiment provides that the radial velocity component includes a radial velocity magnitude and a theta angle, wherein the theta angle is formed between a reference axis perpendicular to a direction of travel of the vehicle and the radial axis.

Another further aspect of the above embodiment provides that a vertex angle of a right triangle is formed between the true velocity vector as a hypotenuse and the radial velocity component as an adjacent side.

Another further aspect of the above embodiment provides that the true velocity direction calculator is further configured to: define the true velocity magnitude as a trigonometric expression equal to the radial velocity magnitude divided by a cosine function of the vertex angle.

Another further aspect of the above embodiment provides that the true velocity direction calculator is further configured to: calculate the vertex angle based on the trigonometric expression.

Another further aspect of the above embodiment provides that the true velocity direction calculator is further configured to: calculate the true velocity angle of direction by adding the beta angle to the theta angle, wherein the true velocity angle is formed between the reference axis and the true velocity vector.

Another aspect of the above embodiment provides that the true velocity vector is calculated in a single radar frame.

Another aspect of the above embodiment provides that the true velocity direction calculator is further configured to: receive one or more of an additional velocity magnitude and additional angle of direction that corresponds to the target object, and perform a sanity check of the true velocity vector using one or more of the additional velocity magnitude and the additional angle of direction, wherein one or more of the additional velocity magnitude and the additional angle of direction are received from one or more of a group including: a communication chain established by the communication protocol from a roadside station or other vehicle, a LIDAR (light detection and ranging) system, a GPS (global positioning system) processor, and a vision processor.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

As used herein, the terms "substantial" and "substantially" mean sufficient to achieve the stated purpose or value in a practical manner, taking into account any minor imperfections or deviations, if any, that arise from usual and expected abnormalities that may occur during radar operation, which are not significant for the stated purpose or value.

Although the invention is described herein with reference to specific embodiments, various modifications and changes can be made without departing from the scope of the present invention as set forth in the claims below. For example, additional or fewer radar sensors may be implemented in FIG. 1. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for determining a target object velocity vector in a radar system, the method comprising:
    obtaining a radial velocity component that corresponds to a target object, based on sensor data detected by a radar sensor on a vehicle;
    obtaining a target object velocity magnitude of the target object from a communication protocol, wherein the target object sends the velocity magnitude of the target object to the vehicle; and
    calculating, by the radial velocity component from sensor data detected by the radar sensor and the target object velocity magnitude from the communication protocol, a target object velocity angle of direction of the target object, based on a trigonometric relationship established between the radial velocity component and the target object velocity vector.

2. The method of claim 1, wherein
the true velocity magnitude is received from the target object through a communication chain established by the communication protocol.

3. The method of claim 1, wherein
the radial velocity component is a vector projection of the target object velocity vector on a radial axis, the radial axis being a straight line extending from the radar sensor through the target object.

4. The method of claim 3, wherein
the radial velocity component comprises a radial velocity magnitude and a theta angle, wherein the theta angle is formed between a reference axis perpendicular to a direction of travel of the vehicle and the radial axis.

5. The method of claim 4, further comprising:
establishing a right triangle relationship between the target object velocity vector as a hypotenuse and the radial velocity component as an adjacent side, which form a vertex angle at the target object.

6. The method of claim 5, further comprising:
defining the target object velocity magnitude as a trigonometric expression equal to the radial velocity magnitude divided by a cosine function of the vertex angle.

7. The method of claim 6, further comprising:
calculating the vertex angle based on the trigonometric expression.

8. The method of claim 7, further comprising:
calculating the target object velocity angle of direction by adding the beta angle to the theta angle, wherein
the target object velocity angle is formed between the reference axis and the target object velocity vector.

9. The method of claim 1, wherein
the target object velocity vector is calculated in a single radar frame.

10. The method of claim 1, further comprising:
receiving one or more of an additional velocity magnitude and additional angle of direction that corresponds to the target object; and
performing a sanity check of the true velocity vector using one or more of the additional velocity magnitude and the additional angle of direction, wherein
one or more of the additional velocity magnitude and the additional angle of direction are received from one or more of a group including:
a communication chain established by the communication protocol from a roadside station or other vehicle,
a LIDAR (light detection and ranging) system,
a GPS (global positioning system) processor, and
a vision processor.

11. A radar system comprising:
a radar sensor on a vehicle;
a radar processor coupled to the radar sensor, the radar processor configured to determine a radial velocity component that corresponds to a target object, based on sensor data detected by the radar sensor;
a communication protocol module configured to receive a target object velocity magnitude from the target object;
a target object velocity direction calculator configured to:
receive the radial velocity component from the radar processor and the target object velocity magnitude from the communication protocol module, and
calculate a target object angle of direction based on a trigonometric relationship established between the radial velocity component and a target object velocity vector.

12. The radar system of claim 11, wherein
the target object velocity magnitude is received from the target object through a communication chain established by the communication protocol module.

13. The radar system of claim 11, wherein
the radial velocity component is a vector projection of the target object velocity vector on a radial axis, the radial axis being a straight line extending from the radar sensor through the target object.

14. The radar system of claim 13, wherein
the radial velocity component comprises a radial velocity magnitude and a theta angle, wherein the theta angle is formed between a reference axis perpendicular to a direction of travel of the vehicle and the radial axis.

15. The radar system of claim 14, wherein
a vertex angle of a right triangle is formed between the target object velocity vector as a hypotenuse and the radial velocity component as an adjacent side.

16. The radar system of claim 15, wherein
the target object velocity direction calculator is further configured to:
define the target object velocity magnitude as a trigonometric expression equal to the radial velocity magnitude divided by a cosine function of the vertex angle.

17. The radar system of claim 16,
the target object velocity direction calculator is further configured to:
calculate the vertex angle based on the trigonometric expression.

18. The radar system of claim 17, wherein
the target object velocity direction calculator is further configured to:
calculate the target object velocity angle of direction by adding the beta angle to the theta angle, wherein
the target object velocity angle is formed between the reference axis and
the target object velocity vector.

19. The radar system of claim 11, wherein
the target object velocity vector is calculated in a single radar frame.

20. The radar system of claim 11, wherein
the target object velocity direction calculator is further configured to:
receive one or more of an additional velocity magnitude and additional angle of direction that corresponds to the target object, and
perform a sanity check of the target object velocity vector using one or more of the additional velocity magnitude and the additional angle of direction, wherein
one or more of the additional velocity magnitude and the additional angle of direction are received from one or more of a group including:
a communication chain established by the communication protocol from a roadside station or other vehicle,
a LIDAR (light detection and ranging) system,
a GPS (global positioning system) processor, and
a vision processor.

* * * * *